US009755550B2

(12) United States Patent
Trainer et al.

(10) Patent No.: US 9,755,550 B2
(45) Date of Patent: Sep. 5, 2017

(54) CONVERTER

(71) Applicant: ALSTOM Technology Ltd, Baden (CH)

(72) Inventors: David Reginald Trainer, Derby (GB); Kevin J. Dyke, Stafford (GB); Colin Oates, Stafford (GB)

(73) Assignee: General Electric Technology GMBH (CH)

( * ) Notice: Subject to any disclaimer, the term of this patent is extended or adjusted under 35 U.S.C. 154(b) by 60 days.

(21) Appl. No.: 14/888,692

(22) PCT Filed: Apr. 3, 2014

(86) PCT No.: PCT/EP2014/056745
§ 371 (c)(1),
(2) Date: Nov. 2, 2015

(87) PCT Pub. No.: WO2014/177340
PCT Pub. Date: Nov. 6, 2014

(65) Prior Publication Data
US 2016/0072407 A1     Mar. 10, 2016

(30) Foreign Application Priority Data

May 3, 2013 (EP) .................................... 13275109

(51) Int. Cl.
*H02M 1/38* (2007.01)
*H02M 7/483* (2007.01)
(Continued)

(52) U.S. Cl.
CPC ................. *H02M 7/68* (2013.01); *H02J 3/36* (2013.01); *H02J 5/00* (2013.01); *H02M 1/12* (2013.01);
(Continued)

(58) Field of Classification Search
CPC ............ H02M 7/04; H02M 7/12; H02M 7/14; H02M 7/143; H02M 7/146; H02M 7/15;
(Continued)

(56) References Cited

U.S. PATENT DOCUMENTS 3,418,558 A * 12/1968 Morgan .................. H02M 1/06
327/440
5,047,913 A    9/1991 De Doncker et al.
(Continued)

FOREIGN PATENT DOCUMENTS

EP        2 797 216 A1    10/2014
WO    WO-2011/050847 A1    5/2011
(Continued)

OTHER PUBLICATIONS

International Search Report and Written Opinion, PCT/EP2014/056745, Alstom Technology Ltd, 8 pages (Jan. 23, 2015).
(Continued)

*Primary Examiner* — Timothy J Dole
*Assistant Examiner* — Ivan Laboy Andino
(74) *Attorney, Agent, or Firm* — GE Global Patent Operation; Scott R. Stanley

(57) ABSTRACT

A voltage source converter includes a converter limb having limb portions separated by an AC terminal and extending between DC terminals, each limb portion including a primary switching element to switch the limb portion into and out of circuit. The converter further includes an auxiliary limb. The primary switching element of each limb portion is switchable to switch the auxiliary limb into and out of circuit with the corresponding limb portion. The converter further includes a control unit to, in one mode, inject a circulation current that flows in one direction in one of the limb portions and minimize a current flowing in the opposite direction in that limb portion. Each primary switching element switches
(Continued)

the respective limb portion into or out of circuit following the minimization of the limb portion current by the circulation current.

15 Claims, 7 Drawing Sheets

(51) Int. Cl.
*H02M 7/219* (2006.01)
*H02M 1/12* (2006.01)
*H02J 3/36* (2006.01)
*H02M 7/68* (2006.01)
*H02J 5/00* (2016.01)
*H02M 1/08* (2006.01)
*H02M 1/00* (2006.01)

(52) U.S. Cl.
CPC .............. *H02M 1/38* (2013.01); *H02M 7/483* (2013.01); *H02M 1/083* (2013.01); *H02M 7/219* (2013.01); *H02M 2001/0058* (2013.01); *H02M 2007/4835* (2013.01)

(58) Field of Classification Search
CPC ........ H02M 7/217; H02M 7/219; H02M 7/42; H02M 7/44; H02M 7/48; H02M 7/483; H02M 7/49; H02M 7/493; H02M 7/537; H02M 7/5387; H02M 7/5388; H02M 7/539; H02M 7/5395; H02M 7/757; H02M 7/7575; H02M 7/797; H02M 2007/4835; H02M 2001/0058; H02M 2001/322; H02M 2001/325; H02M 1/32; H02M 1/083; Y02B 70/1491; Y02B 70/14; Y02B 70/1416; Y02B 70/1425; Y02B 70/1433; Y02B 70/1441; Y02B 70/145
See application file for complete search history.

(56) References Cited

U.S. PATENT DOCUMENTS

| | | | | |
|---|---|---|---|---|
| 6,046,920 | A | * | 4/2000 | Cazabat .............. H02M 7/5236 363/136 |
| 2011/0051474 | A1 | * | 3/2011 | Terui ....................... H02M 1/34 363/37 |
| 2011/0278953 | A1 | * | 11/2011 | Zhang ................... H02M 7/538 307/115 |

FOREIGN PATENT DOCUMENTS

| WO | WO 2011/098117 | A1 | | 8/2011 | |
|---|---|---|---|---|---|
| WO | WO 2012163841 | A1 | * | 12/2012 | ................ H02J 3/36 |
| WO | WO-2014/173606 | A1 | | 10/2014 | |

OTHER PUBLICATIONS

International Preliminary Report on Patentability, PCT/EP2014/056745, Alstom Technology Ltd, 5 pages (Aug. 25, 2015).

\* cited by examiner

CONVERTER

CROSS REFERENCE TO RELATED APPLICATIONS

The present application is a National Stage of International Application No. PCT/EP2014/056745, filed Apr. 3, 2014, which claims priority to European Application No. 13275109, filed May 3, 2013, which is incorporated herein by reference in its entirety.

This invention relates to a voltage source converter.

In power transmission networks alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC power to DC power is also utilized in power transmission networks where it is necessary to interconnect the AC electrical networks operating at different frequencies.

In any such power transmission network, converters are required at each interface between AC and DC power to effect the required conversion, and one such form of converter is a voltage source converter (VSC).

Figure 1A:
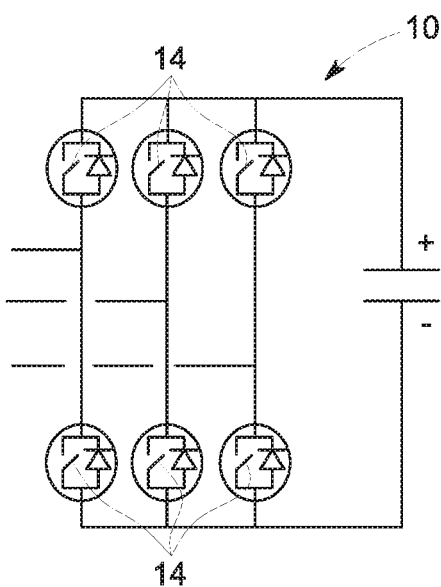
Figure 1B:
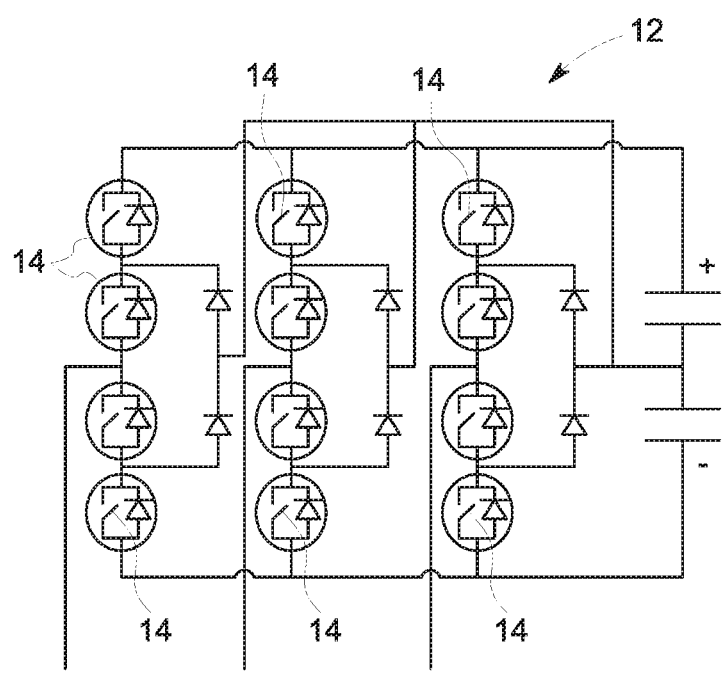
Figure 2:
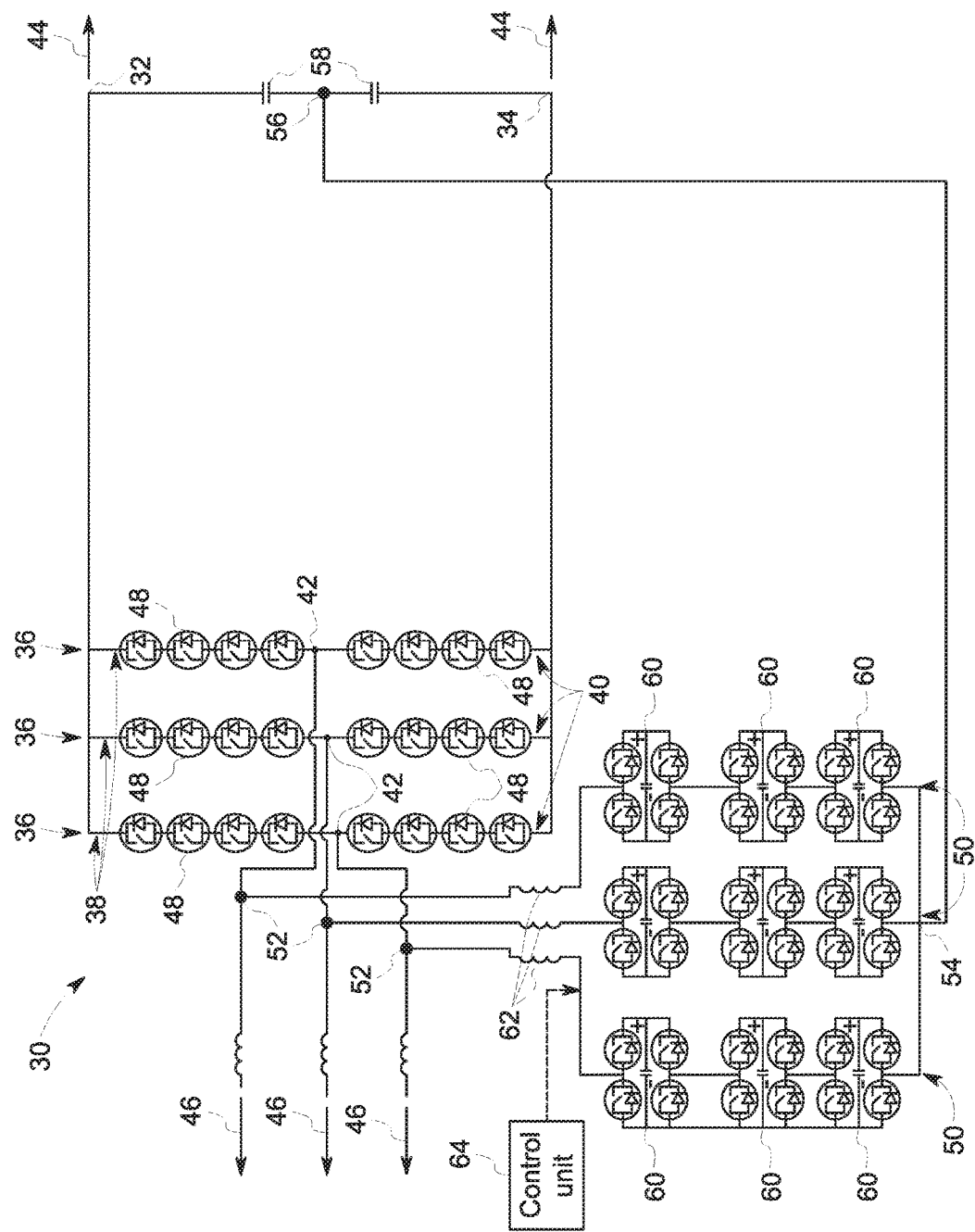
Figure 3:
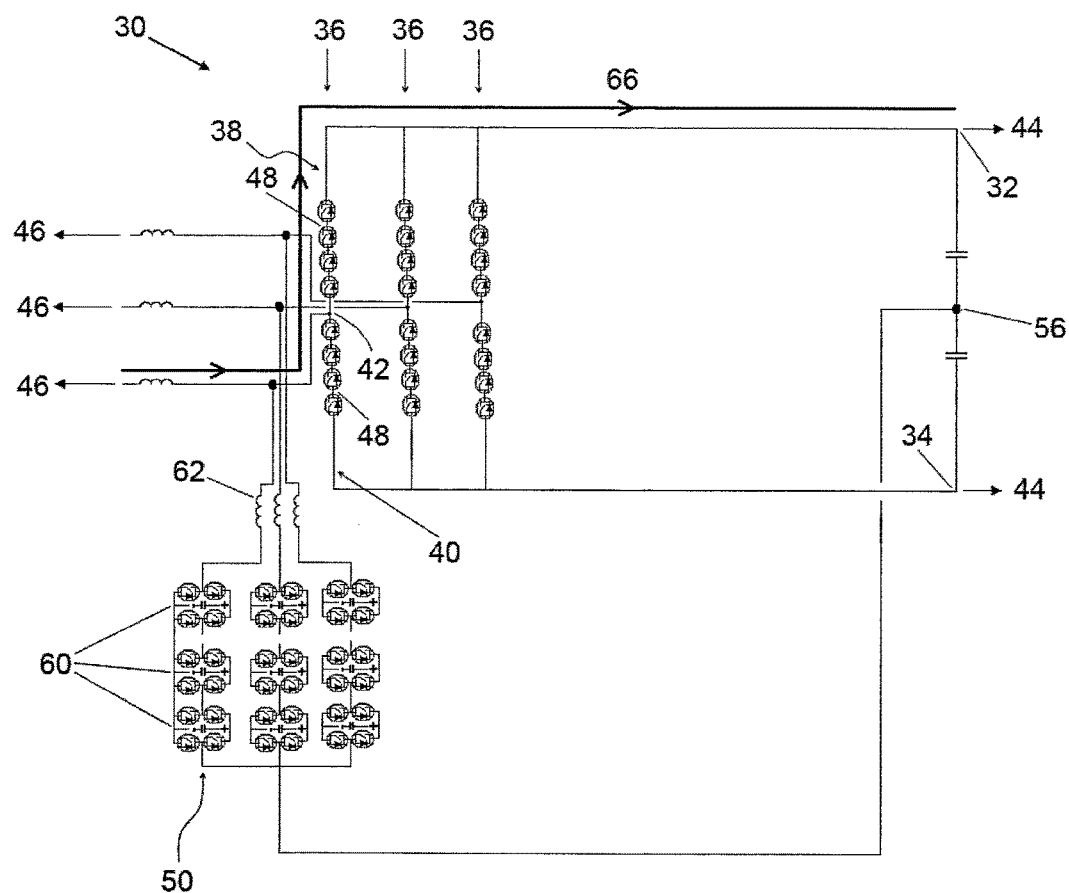
Figure 4:
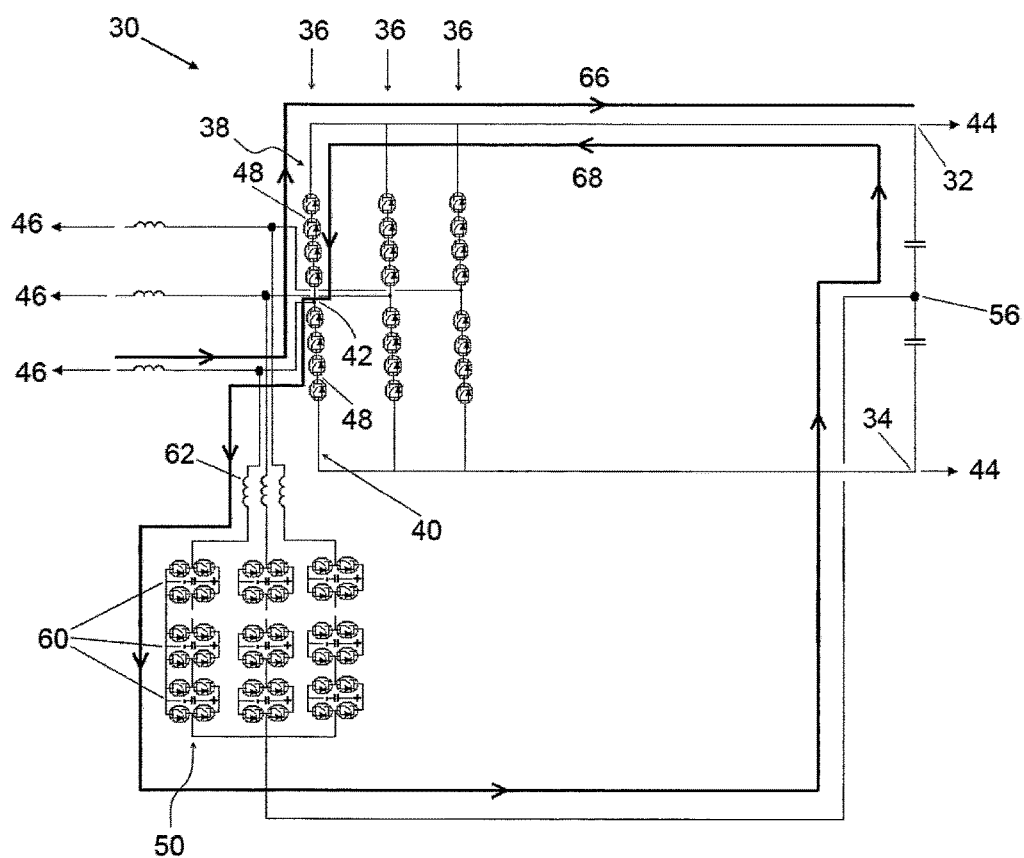
Figure 5:
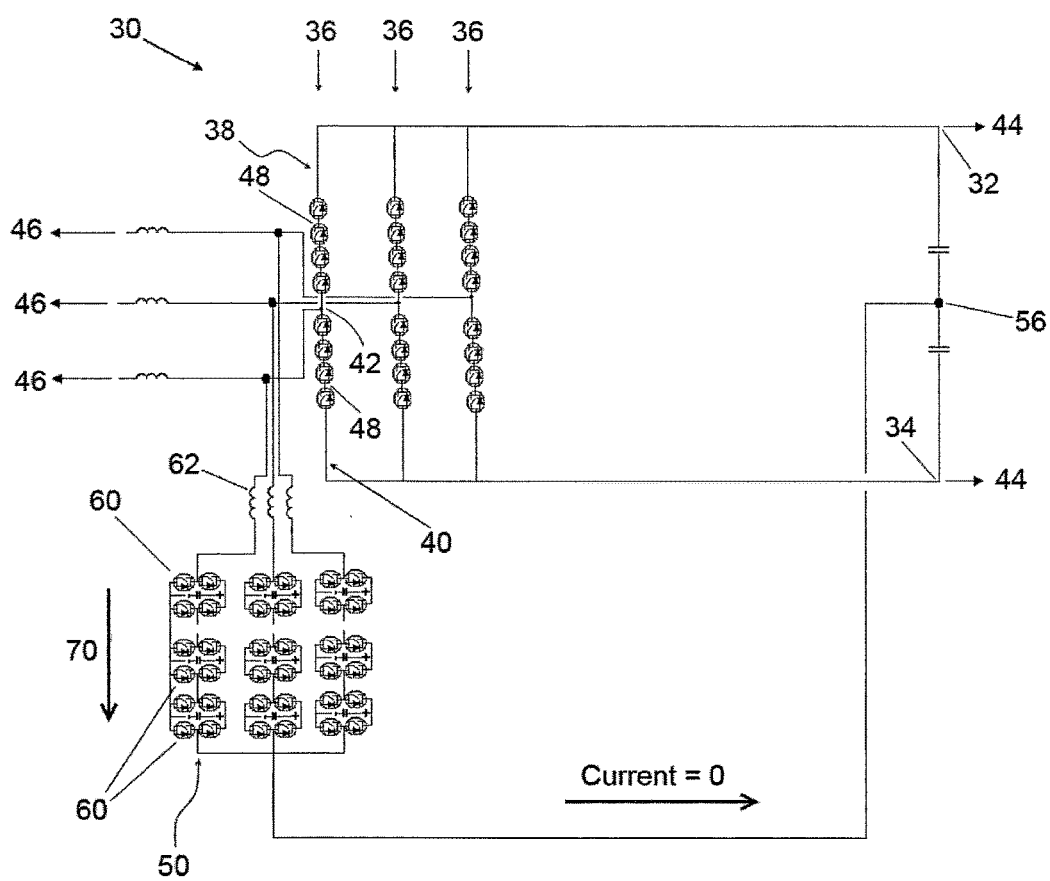
Figure 6:
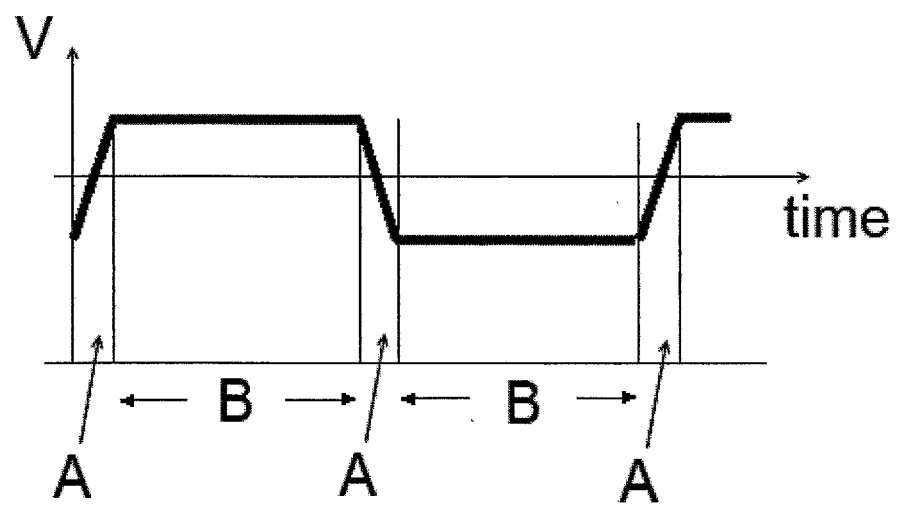
Figure 7:
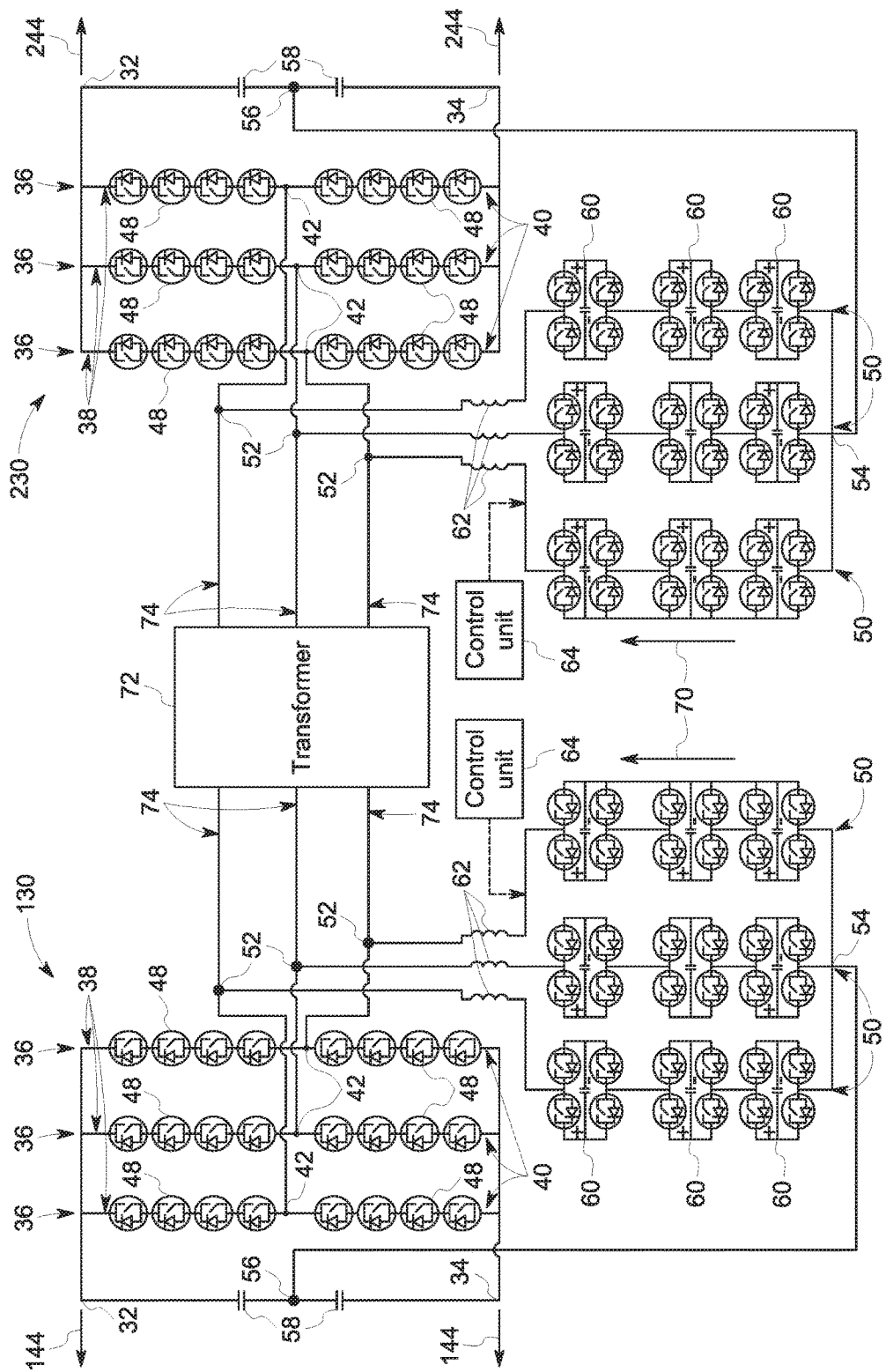

It is known in voltage source converters to use six-switch (two-level) and three-level converter topologies 10,12 with insulated gate bipolar transistors (IGBT) 14, as shown in FIGS. 1a and 1b. The IGBT devices 14 are connected and switched together in series to enable high power ratings of 10's to 100's of MW to be realized. In addition, the IGBT devices 14 switch on and off several times at high voltage over each cycle of the AC supply frequency to control the harmonic currents being fed to the AC electrical network. This leads to high losses, high levels of electromagnetic interference and a complex design.

U.S. Pat. No. 5,047,913 discloses a method for controlling a power converter and an associated auxiliary commutation circuit. Such a power converter includes an inverter with at least two main switching devices per phase. Across each main switching device are connected an antiparallel diode and a relatively large snubber capacitor. The auxiliary resonant commutation circuit comprises two antiparallel-coupled auxiliary switching devices coupled in series with a resonant circuit including an inductor and the snubber capacitors. The gating and conduction times of the main and auxiliary switching devices are controlled so as to add boosting energy to the resonant operation, thus ensuring that the inverter output voltage at least reaches the positive and negative inverter rail voltages during each resonant commutation cycle.

WO 2011/098117 A1 discloses a voltage source converter comprising three phase elements defining a star connection in which a first end of each phase element is connected to a common junction; at least two converter limbs, each converter limb including first and second DC terminals for connection in use to a DC network and an AC terminal connected in series with a second end of a phase element, each converter limb defining first and second limb portions, including a chain-link converter, each chain-link converter including chain-link modules; and a third DC terminal connected to the common junction of the star connection to define an auxiliary connection, wherein in use a current is injected into the auxiliary connection to modify a voltage of each chain-link module in each limb portion.

According to a first aspect of the invention, there is provided a voltage source converter comprising:

a converter limb extending between first and second DC terminals and having first and second limb portions separated by an AC terminal, the first and second DC terminals being connectable to a DC electrical network and the AC terminal being connectable to an AC electrical network, each limb portion including a primary switching element, the primary switching element of each limb portion being switchable to switch the corresponding limb portion into and out of circuit between the corresponding DC terminal and the AC terminal to control the configuration of an AC voltage at the AC terminal;

an auxiliary limb including an auxiliary converter, the auxiliary converter including at least one auxiliary switching element, the auxiliary limb being connected to the AC terminal, the primary switching element of each limb portion being switchable to switch the auxiliary limb into and out of circuit with the corresponding limb portion and thereby switch the auxiliary limb into and out of circuit with the corresponding DC terminal; and a control unit to selectively control the switching of the or each auxiliary switching element of the auxiliary converter to control the auxiliary limb as a current source in a primary operating mode to inject a circulation current that flows in one direction in one of the first and second limb portions to minimise a limb portion current flowing in the opposite direction in that limb portion, wherein the primary switching elements are configured to switch the one of the first and second limb portions out of circuit between the corresponding DC terminal and the AC terminal and switch the other of the first and second limb portions into circuit between the corresponding DC terminal and the AC terminal, following the minimisation of the limb portion current by the circulation current, when a minimal or zero current flows through the corresponding primary switching element during the commutation of current from the one of the first and second limb portions to the other of the first and second limb portions.

During operation of the voltage source converter to transfer power between the AC and DC electrical networks, the primary switching elements of the limb portions are switched to alternately switch the limb portions into circuit between the AC terminal and the corresponding DC terminal over a duty cycle. This means that the flow of current in the voltage source converter alternates between the limb portions over the duty cycle. As such, when one of the limb portions is switched into circuit between the AC terminal and the corresponding DC terminal and thereby is conducting a limb portion current between the AC terminal and corresponding DC terminal, the other of the limb portions is switched out of circuit between the AC terminal and the corresponding DC terminal and thereby is not conducting any limb portion current between the AC terminal and corresponding DC terminal.

Prior to the commutation of current from one limb portion to the other limb portion (i.e. prior to the switching of each limb portion into or out of circuit between the AC terminal and the corresponding DC terminal), the auxiliary limb is controlled as a current source in the primary operating mode to inject the circulation current to minimise the limb portion current flowing in the conducting limb portion. This enables soft-switching of the primary switching elements of the limb portions, thus minimising switching losses during operation of the voltage source converter to transfer power between the AC and DC electrical networks.

In contrast, omission of the auxiliary limb and control unit from the voltage source converter means that the conducting limb portion is conducting a significant level of current immediately prior to the commutation of current from one limb portion to the other limb portion, thus resulting in the problems described earlier with reference to the conventional voltage source converters of FIGS. 1a and 1b.

The configuration of the voltage source converter according to the invention therefore results in an efficient means of connecting the AC and DC electrical networks and transferring power therebetween.

The auxiliary limb is only required to be controlled as a current source in the primary operating mode to enable soft-switching of the primary switching elements of the limb portions for relatively short periods of times over a duty cycle. As a result, the overall rating of the voltage source converter may be reduced by optimising the auxiliary limb for this specific task.

In embodiments of the invention, the circulation and limb portion currents may be equal in magnitude. This enables the limb portion current in the conducting limb portion to be reduced to zero to enable zero current switching of the primary switching elements of the limb portions.

Depending on the requirements of the associated power application, each limb portion may be switched into and out of circuit between the corresponding DC terminal and the AC terminal once or a plurality of times (e.g. in a pulse width modulated manner) per cycle of fundamental frequency of the AC electrical network. Thus, prior to the or each switching of each limb portion into or out of circuit between the AC terminal and the corresponding DC terminal in a cycle of fundamental frequency of the AC electrical network, the voltage source converter may be operated accordingly to enable soft-switching of the primary switching elements of the limb portions. More particularly, in embodiments of the invention, the control unit may be configured to selectively control the switching of the or each auxiliary switching element of the auxiliary converter to control the auxiliary limb as a current source in the primary operating mode once or a plurality of times per cycle of fundamental frequency of the AC electrical network.

In further embodiments of the invention, the control unit may be configured to selectively control the switching of the or each auxiliary switching element of the auxiliary converter to control the auxiliary limb as a current source in a secondary operating mode to inject a current into the AC terminal to:

filter one or more current components from an alternating current presented to the AC electrical network and/or a direct current presented to the DC electrical network (i.e. carry out active current filtering); and/or modify an alternating current presented to the AC electrical network into a leading or lagging alternating current (i.e. carry out reactive power compensation).

In other words, the control unit may be configured to selectively control the switching of the or each auxiliary switching element of the auxiliary converter to control the auxiliary limb as a current source in the secondary operating mode to inject a current into the AC terminal to:

only carry out active current filtering;
only carry out reactive power compensation;
sequentially carry out active current filtering and reactive power compensation;
simultaneously carry out active current filtering and reactive power compensation.

The configuration of the voltage source converter to enable further control of the auxiliary limb as a current source in the secondary operating mode provides the voltage source converter with active current filtering and/or reactive power compensation capabilities.

The provision of the voltage source converter with the active current filtering capability renders the voltage source converter capable of producing high quality output currents at the AC and/or DC terminals of the voltage source converter through cancellation of one or more unwanted current components (e.g. harmonic current components, DC ripple). In contrast, omission of the active current filtering capability from the voltage source converter means that it would be necessary to connect additional filtering hardware to the AC and/or DC terminals of the voltage source converter to obtain the desired high quality output currents, thus adding to the real estate requirements of the voltage source converter.

The provision of the voltage source converter with the reactive power compensation capability renders the voltage source converter capable of exchanging reactive power to the AC electrical network to meet a desired real power-reactive power operating envelope. In addition, if the AC terminal is connected in use to a transformer, reactive power may be exchanged with the AC electrical network to fulfil reactive power requirements of the transformer. In contrast, omission of the reactive power compensation capability from the voltage source converter means that it would be necessary to connect additional converter hardware to the AC terminal of the voltage source converter to enable exchange of reactive power with the AC electrical network, thus further adding to the real estate requirements of the voltage source converter.

The configuration of the voltage source converter to enable further control of the auxiliary limb as a controlled source in the secondary operating mode therefore provides the voltage source converter with additional power transfer functionality without requiring the connection of additional hardware to the voltage source converter, thus increasing the efficiency and reliability of the voltage source converter.

The control unit may be configured to selectively control the switching of the or each auxiliary switching element of the auxiliary converter to control the auxiliary limb as a current source in the primary and secondary operating modes in various sequential orders.

For example, in embodiments of the invention, the control unit may be configured to selectively control the switching of the or each auxiliary switching element of the auxiliary converter to control the auxiliary limb as a current source alternately in the primary and secondary operating modes.

Alternating between the primary and secondary operating modes enables the auxiliary limb to be controlled as a current source to inject a current to not only enable soft-switching of the primary switching elements of the limb portions during the operation of the voltage source converter to transfer power between the AC and DC electrical networks, but also carry out active current filtering and/or reactive power compensation in the periods before and after the commutation of current from one limb portion to the other limb portion. In this manner the auxiliary limb is in use throughout the operation of the voltage source converter to transfer power between the AC and DC electrical networks, thus maximising the usage of the auxiliary limb and thereby further increasing the efficiency of the voltage source converter.

In embodiments of the invention, the auxiliary limb may further include at least one impedance element, and the control unit may be configured to selectively control the switching of the or each auxiliary switching element of the auxiliary converter to modify the voltage across the or each impedance element to control the auxiliary limb as a current source in the or each operating mode. The or each impedance element may include, for example, an inductor.

The inclusion of the or each impedance element in the auxiliary limb provides a reliable means of decoupling of the AC voltage at the AC terminal and any voltage generated by the auxiliary converter to enable control of the auxiliary limb as a current source.

The manner in which the auxiliary limb is connected to the AC terminal may vary.

In embodiments of the invention, a first end of the auxiliary limb may be connected to the AC terminal and a second end of the auxiliary limb is connectable to ground.

In further embodiments of the invention, a first end of the auxiliary limb may be connected to the AC terminal and a second end of the auxiliary limb is connected to a third DC terminal connected between the first and second DC terminals. The third DC terminal may be a junction between two DC link capacitive elements connected between the first and second DC terminals.

In embodiments of the invention, the auxiliary converter may include at least one module, the or each module including at least one auxiliary switching element and at least one energy storage device, the or each auxiliary switching element and the or each energy storage device of each module combining to selectively provide a voltage source.

The inclusion of the or each module in the auxiliary converter provides reliable means of controlling the auxiliary limb as a current source in the or each operating mode.

In such embodiments, the or each auxiliary switching element and the or each energy storage device in the or each module may combine to selectively provide a bidirectional voltage source that can provide negative, zero or positive voltage. The configuration of the or each module to provide a bidirectional voltage source may vary. For example, the or each module may include two pairs of auxiliary switching elements connected in parallel with an energy storage device in a full-bridge arrangement to define a 4-quadrant bipolar module that can provide negative, zero or positive voltage and can conduct current in two directions.

In embodiments employing the use of at least one module, the auxiliary converter may include a plurality of series-connected modules. The plurality of series-connected modules defines a chain-link converter.

It is possible to build up a combined voltage across the chain-link converter, which is higher than the voltage available from each of its individual modules, via the insertion of the energy storage devices of multiple modules, each providing its own voltage, into the chain-link converter. In this manner switching of the or each auxiliary switching element in each module causes the chain-link converter to provide a stepped variable voltage source, which permits the generation of a voltage waveform across the chain-link converter using a step-wise approximation. This in turn enables the auxiliary limb to inject a high quality current, thus enhancing the active current filtering and reactive power compensation capabilities of the voltage source converter.

In addition the modular arrangement of the chain-link converter means that it is straightforward to increase or decrease the number of modules in the chain-link converter to achieve a desired voltage rating, active current filtering capability and reactive power compensation capability.

Each energy storage device may be any device that is capable of storing and releasing energy, e.g. a capacitor, fuel cell or battery.

The capability of the voltage source converter to control the auxiliary limb as a current source in the or each operating mode permits simplification of the design and construction of the limb portions whilst providing high quality power transfer between the AC and DC electrical networks.

For example, in embodiments of the invention, each limb portion may be arranged in the form of a two-state switching block, the first limb portion having a first end connected to the first DC terminal, the first limb portion having a second end connected to the AC terminal, the second limb portion having a first end connected to the second DC terminal, the second limb portion having a second end connected to the AC terminal.

Switching elements with high voltage ratings can be selected for use in the limb portions to further reduce the footprint of the voltage source converter and thereby minimise the real estate costs of the voltage source converter.

At least one primary switching element may include a naturally-commutated active switching device (e.g. a thyristor) or a passive current check device (e.g. a diode). The use of at least one naturally-commutated active switching device or passive current check device in each limb portion not only improves the robustness of the limb portions, but also makes the limb portions capable of withstanding surge currents that might occur due to faults in the DC electrical network due to their construction.

At least one switching element may include a self-commutated active switching device. The self-commutated active switching device may be an insulated gate bipolar transistor, a gate turn-off thyristor, a field effect transistor, an injection-enhanced gate transistor, an integrated gate commutated thyristor or any other self-commutated switching device.

Each switching element may include a switching sub-element or a plurality of series-connected switching sub-elements. The or each switching sub-element may include a single active switching device or a plurality of series-connected active switching devices.

When each switching element includes a switching sub-element, each switching element may further include a passive current check element, the passive current check element being connected in anti-parallel with the single active switching device or the plurality of series-connected active switching devices.

When each switching element includes a plurality of series-connected switching sub-elements, each switching element may include a plurality of passive current check elements, each of the plurality of passive current check elements being connected in anti-parallel with the single active switching device or the plurality of series-connected active switching devices of a respective one of the series-connected switching sub-elements.

The number of active switching devices in each switching element may vary depending on the required voltage rating of that switching element.

The or each passive current check element may include a single passive current check device or a plurality of series-connected passive current check devices. The or each passive current check device may be any device that is capable of limiting current flow in only one direction, e.g. a diode.

The number of passive current check devices in each passive current check element may vary depending on the required voltage rating of that passive current check element.

The voltage source converter may be a multi-phase voltage source converter. For example, in embodiments of the invention, the voltage source converter may include a plurality of converter limbs and a plurality of auxiliary limbs, the AC terminal of each converter limb being connectable to a respective phase of a multi-phase AC electrical network, each auxiliary limb being connected to a respective one of the AC terminals.

In such embodiments of the invention in which a first end of each auxiliary limb is connected to the corresponding AC terminal and a second end of each auxiliary limb is connected to a third DC terminal connected between the first and second DC terminals, the control unit may be configured to selectively control the switching of the or each auxiliary switching element of each auxiliary converter to minimise a current flowing into the third DC terminal during the control of each auxiliary limb as a current source in the secondary operating mode. This prevents any unwanted current from flowing into the third DC terminal during the control of each auxiliary limb as a current source in the secondary operating mode.

According to a second aspect of the invention, there is provided a DC to DC converter assembly comprising:
  a first voltage source converter according to any embodiment of the first aspect of the invention; and
  a second voltage source converter according to any embodiment of the first aspect of the invention,
  wherein each AC terminal of the first voltage source converter is connected to a respective one of the AC terminals of the second voltage source converter via a respective one of a plurality of transmission links.

Each AC terminal of the first voltage source converter may be directly connected to a respective one of the AC terminals of the second voltage source converter via a respective one of the plurality of transmission links. Alternatively each AC terminal of the first voltage source converter may be connected to a respective one of the AC terminals of the second voltage source converter via a transformer and a respective one of the plurality of transmission links.

The invention claimed is:

1. A voltage source converter comprising:
  a converter limb extending between first and second DC terminals and having first and second limb portions separated by an AC terminal, the first and second DC terminals being connectable to a DC electrical network and the AC terminal being connectable to an AC electrical network, each limb portion including a primary switching element, the primary switching element of each limb portion being switchable to switch the corresponding limb portion into and out of circuit between the corresponding DC terminal and the AC terminal to control the configuration of an AC voltage at the AC terminal;
  an auxiliary limb including an auxiliary converter, the auxiliary converter including at least one auxiliary switching element, the auxiliary limb being connected to the AC terminal, the primary switching element of each limb portion being switchable to switch the auxiliary limb into and out of circuit with the corresponding limb portion and thereby switch the auxiliary limb into and out of circuit with the corresponding DC terminal; and
  a control unit to selectively control the switching of the or each auxiliary switching element of the auxiliary converter to control the auxiliary limb as a current source in a primary operating mode to inject a circulation current that flows in one direction in one of the first and second limb portions to minimize a limb portion current flowing in the opposite direction in that limb portion,
  wherein the primary switching elements are configured to switch the one of the first and second limb portions out of circuit between the corresponding DC terminal and the AC terminal and switch the other of the first and second limb portions into circuit between the corresponding DC terminal and the AC terminal, following the minimization of the limb portion current by the circulation current, when a minimal or zero current flows through the corresponding primary switching element during the commutation of current from the one of the first and second limb portions to the other of the first and second limb portions.

2. The voltage source converter according to claim 1 wherein the circulation and limb portion currents are equal in magnitude.

3. The voltage source converter according to claim 1 wherein the control unit is configured to selectively control the switching of the or each auxiliary switching element of the auxiliary converter to control the auxiliary limb as a current source in the primary operating mode once or a plurality of times per cycle of fundamental frequency of the AC electrical network.

4. The voltage source converter according to claim 1 wherein the auxiliary limb further includes at least one impedance element, and the control unit is configured to selectively control the switching of the or each auxiliary switching element of the auxiliary converter to modify a voltage across the or each impedance element to control the auxiliary limb as a current source in the or each operating mode.

5. The voltage source converter according to claim 1 wherein a first end of the auxiliary limb is connected to the AC terminal and a second end of the auxiliary limb is connectable to ground.

6. The voltage source converter according to claim 1 wherein a first end of the auxiliary limb is connected to the AC terminal and a second end of the auxiliary limb is connected to a third DC terminal that is connected between the first and second DC terminals.

7. The voltage source converter according to claim 1 wherein each limb portion is arranged in the form of a two-state switching block, the first limb portion having a first end connected to the first DC terminal, the first limb portion having a second end connected to the AC terminal, the second limb portion having a first end connected to the second DC terminal, the second limb portion having a second end connected to the AC terminal.

8. The voltage source converter according to claim 1 wherein the control unit is configured to selectively control the switching of the or each auxiliary switching element of the auxiliary converter to control the auxiliary limb as a current source in a secondary operating mode to inject a current into the AC terminal to:
  filter one or more current components from an alternating current presented to the AC electrical network and/or a direct current presented to the DC electrical network; and/or
  modify an alternating current presented to the AC electrical network into a leading or lagging alternating current.

9. The voltage source converter according to claim 8 wherein the control unit is configured to selectively control the switching of the or each auxiliary switching element of the auxiliary converter to control the auxiliary limb as a current source alternately in the primary and secondary operating modes.

10. The voltage source converter according to claim 1 wherein the auxiliary converter includes at least one module, the or each module including at least one auxiliary switching element and at least one energy storage device, the or each auxiliary switching element and the or each energy storage device of each module combining to selectively provide a voltage source.

11. The voltage source converter according to claim 10 wherein the or each auxiliary switching element and the or each energy storage device in the or each module combine to selectively provide a bidirectional voltage source that can provide negative, zero or positive voltage.

12. The voltage source converter according to claim 10 wherein the auxiliary converter includes a plurality of series-connected modules.

13. The voltage source converter according to claim 1 including a plurality of converter limbs and a plurality of auxiliary limbs, the AC terminal of each converter limb being connectable to a respective phase of a multi-phase AC electrical network, each auxiliary limb being connected to a respective one of the AC terminals.

14. The voltage source converter according to claim 13 wherein:
  the control unit is configured to selectively control the switching of the or each auxiliary switching element of the auxiliary converter to control the auxiliary limb as a current source in a secondary operating mode to inject a current into the AC terminal to:
    filter one or more current components from an alternating current presented to the AC electrical network and/or a direct current presented to the DC electrical network; and/or
    modify an alternating current presented to the AC electrical network into a leading or lagging alternating current;
  a first end of the auxiliary limb is connected to the AC terminal and a second end of the auxiliary limb is connected to a third DC terminal that is connected between the first and second DC terminals; and
  the control unit is configured to selectively control the switching of the or each auxiliary switching element of each auxiliary converter to minimize a current flowing into the third DC terminal during the control of each auxiliary limb as a current source in the secondary operating mode.

15. A DC to DC converter assembly comprising:
  a first voltage source converter comprising:
    a first converter limb extending between first and second DC terminals and having first and second limb portions separated by a first AC terminal, the first and second DC terminals being connectable to a DC electrical network and the first AC terminal being connectable to an AC electrical network, each limb portion of the first voltage source converter including a primary switching element, the primary switching element of each limb portion being switchable to switch the corresponding limb portion into and out of circuit between the corresponding DC terminal and the first AC terminal to control the configuration of an AC voltage at the first AC terminal;
    a first auxiliary limb including a first auxiliary converter, the first auxiliary converter including at least one first auxiliary switching element, the first auxiliary limb being connected to the first AC terminal, the primary switching element of each limb portion of the first voltage source converter being switchable to switch the first auxiliary limb into and out of circuit with the corresponding limb portion and thereby switch the first auxiliary limb into and out of circuit with the corresponding DC terminal; and
    a first control unit to selectively control the switching of the or each first auxiliary switching element of the first auxiliary converter to control the first auxiliary limb as a current source in a primary operating mode to inject a circulation current that flows in one direction in one of the first and second limb portions to minimize a limb portion current flowing in the opposite direction in that limb portion;
  wherein the primary switching elements of the first voltage source converter are configured to switch the one of the first and second limb portions out of circuit between the corresponding DC terminal and the first AC terminal and switch the other of the first and second limb portions into circuit between the corresponding DC terminal and the first AC terminal, following the minimization of the limb portion current by the circulation current, when a minimal or zero current flows through the corresponding primary switching element of the first voltage source converter during the commutation of current from the one of the first and second limb portions to the other of the first and second limb portions;
  a second voltage source converter comprising:
    a second converter limb extending between third and fourth DC terminals and having third and fourth limb portions separated by a second AC terminal, the third and fourth DC terminals being connectable to the DC electrical network and the second AC terminal being connectable to the AC electrical network, each limb portion of the second voltage source converter including a primary switching element, the primary switching element of each limb portion being switchable to switch the corresponding limb portion into and out of circuit between the corresponding DC terminal and the second AC terminal to control the configuration of an AC voltage at the second AC terminal;
    a second auxiliary limb including a second auxiliary converter, the second auxiliary converter including at least one second auxiliary switching element, the second auxiliary limb being connected to the second AC terminal, the primary switching element of each limb portion of the second voltage source converter being switchable to switch the second auxiliary limb into and out of circuit with the corresponding limb portion and thereby switch the second auxiliary limb into and out of circuit with the corresponding DC terminal; and
    a second control unit to selectively control the switching of the or each second auxiliary switching element of the second auxiliary converter to control the second auxiliary limb as a current source in a primary operating mode to inject a circulation current that flows in one direction in one of the third and fourth limb portions to minimize a limb portion current flowing in the opposite direction in that limb portion;
  wherein the primary switching elements of the second voltage source converter are configured to switch the one of the third and fourth limb portions out of circuit between the corresponding DC terminal and the second AC terminal and switch the other of the third and fourth limb portions into circuit between the corresponding DC terminal and the second AC terminal, following the minimization of the limb portion current by the circulation current, when a minimal or zero current flows through the corresponding primary switching element of the second voltage source converter during the commutation of current from the one of the third and fourth limb portions to the other of the third and fourth limb portions;

wherein the first AC terminal of the first voltage source converter is connected to the second AC terminal of the second voltage source converter via a respective one of a plurality of transmission links.

\* \* \* \* \*